US010878231B2

(12) United States Patent
Sakuma et al.

(10) Patent No.: US 10,878,231 B2
(45) Date of Patent: Dec. 29, 2020

(54) WRITING RECOGNITION USING WEARABLE PRESSURE SENSING DEVICE

(71) Applicant: International Business Machines Corporation, Armonk, NY (US)

(72) Inventors: Katsuyuki Sakuma, Fishkill, NY (US); Stephen J. Heisig, Tarrytown, NY (US); John J. Rice, Mohegan Lake, NY (US); John Knickerbocker, Yorktown Heights, NY (US); Gaddi Blumrosen, New York, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 267 days.

(21) Appl. No.: 15/975,897

(22) Filed: May 10, 2018

(65) Prior Publication Data

US 2019/0347479 A1 Nov. 14, 2019

(51) Int. Cl.
*G06K 9/00* (2006.01)
*G06F 3/0354* (2013.01)
(Continued)

(52) U.S. Cl.
CPC ......... *G06K 9/00409* (2013.01); *G06F 3/014* (2013.01); *G06F 3/0346* (2013.01);
(Continued)

(58) Field of Classification Search
None
See application file for complete search history.

(56) References Cited

U.S. PATENT DOCUMENTS 5,621,913 A 4/1997 Tuttle et al.
5,818,963 A * 10/1998 Murdock ........... G06K 9/00865
382/187
(Continued)

FOREIGN PATENT DOCUMENTS

CN 100395691 C 8/2006
CN 101893988 B 10/2013

OTHER PUBLICATIONS

Osamu Asai ("Wearable input device by fingertip motion" IEEE, 2015 International Symposium on Micro-NanoMechatronics and Human Science (MHS); 2015, pp. 1-3). (Year: 2015).*
(Continued)

*Primary Examiner* — Wei Wen Yang
(74) *Attorney, Agent, or Firm* — Garg Law Firm, PLLC; Rakesh Garg; Anthony Curro

(57) ABSTRACT

Writing recognition using a wearable pressure sensing device includes receiving pressure measurement data from a pressure sensor disposed upon a body part of a user. The pressure measurement data is indicative of a change in pressure of the body part due to an interaction of the body part with a medium indicative of a writing gesture by the user. A start boundary and end boundary for each of a plurality of writing symbols is detected based upon the pressure measurement data. At least one feature of the pressure measurement data associated with the plurality of writing symbols is extracted. A symbol pattern is detected based upon the extracted features, and at least one letter is detected based upon the symbol pattern. A word is detected based upon the detected at least one letter.

20 Claims, 12 Drawing Sheets

(51) Int. Cl.
  *G06K 9/20* (2006.01)
  *G06K 9/40* (2006.01)
  *G06K 9/42* (2006.01)
  *G06F 3/01* (2006.01)
  *G06F 3/0346* (2013.01)
  *G06K 9/72* (2006.01)
  *G06F 3/0488* (2013.01)

(52) U.S. Cl.
  CPC ........ *G06F 3/0354* (2013.01); *G06F 3/04883* (2013.01); *G06K 9/209* (2013.01); *G06K 9/40* (2013.01); *G06K 9/42* (2013.01); *G06K 9/72* (2013.01); *G06F 2203/0331* (2013.01); *G06K 2209/01* (2013.01)

(56) References Cited

U.S. PATENT DOCUMENTS

| | | | |
|---|---|---|---|
| 6,078,791 | A | 6/2000 | Tuttle et al. |
| 6,388,247 | B2 | 5/2002 | Asada et al. |
| 9,357,825 | B2 | 6/2016 | Yamasaki |
| 2005/0172734 | A1 | 8/2005 | Gunilla et al. |
| 2006/0161992 | A1* | 7/2006 | Kempf ............... G06K 9/00154 726/34 |
| 2008/0136775 | A1 | 6/2008 | Conant |
| 2012/0313882 | A1 | 12/2012 | Roland et al. |
| 2014/0123048 | A1 | 5/2014 | Bodipat |
| 2014/0160003 | A1 | 6/2014 | Follis et al. |
| 2015/0338916 | A1 | 11/2015 | Bodhi et al. |
| 2015/0363034 | A1 | 12/2015 | Hinckley et al. |

OTHER PUBLICATIONS

Mascaro et al.,"Photoplethysmograph Fingernail Sensors for Measuring Finger Focus Without Haptic Obstruction", IEEE Trans. on Robotics and Automation, vol. 17, No. 5, Oct. 2001, pp. 698-708.
Kao, Hsin-Liu et al., entitled "NailO: Fingernails as an Input Surface", Proc. of the 33rd Annual ACM Conf. on Human Factors in Computing Systems (CHI '15), pp. 3015-3018, Apr. 18-23, 2015.
Tamaki, Emi et al., entitled "A half-implant device on fingernails", Proc. of the 5th Augmented Human Int. Conf. (AH '14), Article 10, 4 pages, Mar. 7, 2014.
International Searching Authority, PCT/IB2019/053580, dated Jul. 31, 2019.

* cited by examiner

WRITING RECOGNITION USING WEARABLE PRESSURE SENSING DEVICE

TECHNICAL FIELD

The present invention relates generally to a method, system, and computer program product for writing recognition. More particularly, the present invention relates to a method, system, and computer program product for writing recognition using a wearable pressure sensing device attached to a body part of user.

BACKGROUND

Writing and hand writing recognition has played important role in human culture. Handwriting recognition refers the ability of a computer to receive handwritten communication and interpret the handwritten communication. Until recently, writing has been restricted to two essential supplementary objects: a writing surface such as paper or a tablet, and a writing tool such as a pen, pencil or stylus. Electronic handwriting recognition often requires the use of a particular writing surface and/or writing tool. For example, some implementations of handwriting recognition require the use of a touch sensitive writing surface or screen. A writing surface and writing tool are often always available and often. Even when the writing surface and writing tool are available, they may be restricted to a particular environment, such as a home environment, and/or require specific lighting conditions.

SUMMARY

The illustrative embodiments provide a method, system, and computer program product. An embodiment of a method of writing recognition using a wearable pressure sensing device includes receiving pressure measurement data from a pressure sensor disposed upon a body part of a user. In the embodiment, the pressure measurement data is indicative of a change in pressure of the body part due to an interaction of the body part with a medium indicative of a writing gesture by the user. The embodiment further includes detecting a start boundary and end boundary for each of a plurality of writing symbols based upon the pressure measurement data, and extracting at least one feature of the pressure measurement data associated with the plurality of writing symbols. The embodiment further includes detecting a symbol pattern based upon the extracted features, detecting at least one letter based upon the symbol pattern, and detecting a word based upon the detected at least one letter.

An embodiment further includes receiving kinetic data from a kinetic sensor disposed upon the body part of a user, wherein the detecting of the symbol pattern is further based upon the kinetic data. An embodiment further includes reducing a dimensionality of the pressure measurement data prior to the detecting of the start boundary and end boundary. An embodiment further includes pre-processing the pressure measurement data prior to the reducing of the dimensionality of the pressure measurement data. In an embodiment, pre-processing of the pressure measurement data includes one or more of filtering out a bias and undesired frequencies content from the pressure measurement data, scaling the pressure measurement data and removing temporal artifacts from the pressure measurement data.

An embodiment further includes detecting a command based upon the extracted features. An embodiment further includes detecting a symbol of a virtual keyboard based upon the extracted features. An embodiment further includes detecting a medical condition of the user based upon the extracted features.

In an embodiment, the at least one feature includes one or more of a spatial feature, a temporal feature, and a spectral feature of the pressure measurement data. In an embodiment, detecting of the symbol pattern is based upon prior statistical knowledge. In an embodiment, the detecting of the at least one letter is performed using at least one of machine learning on the extracted features or on raw data of the pressure sensor with additional sensor data.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
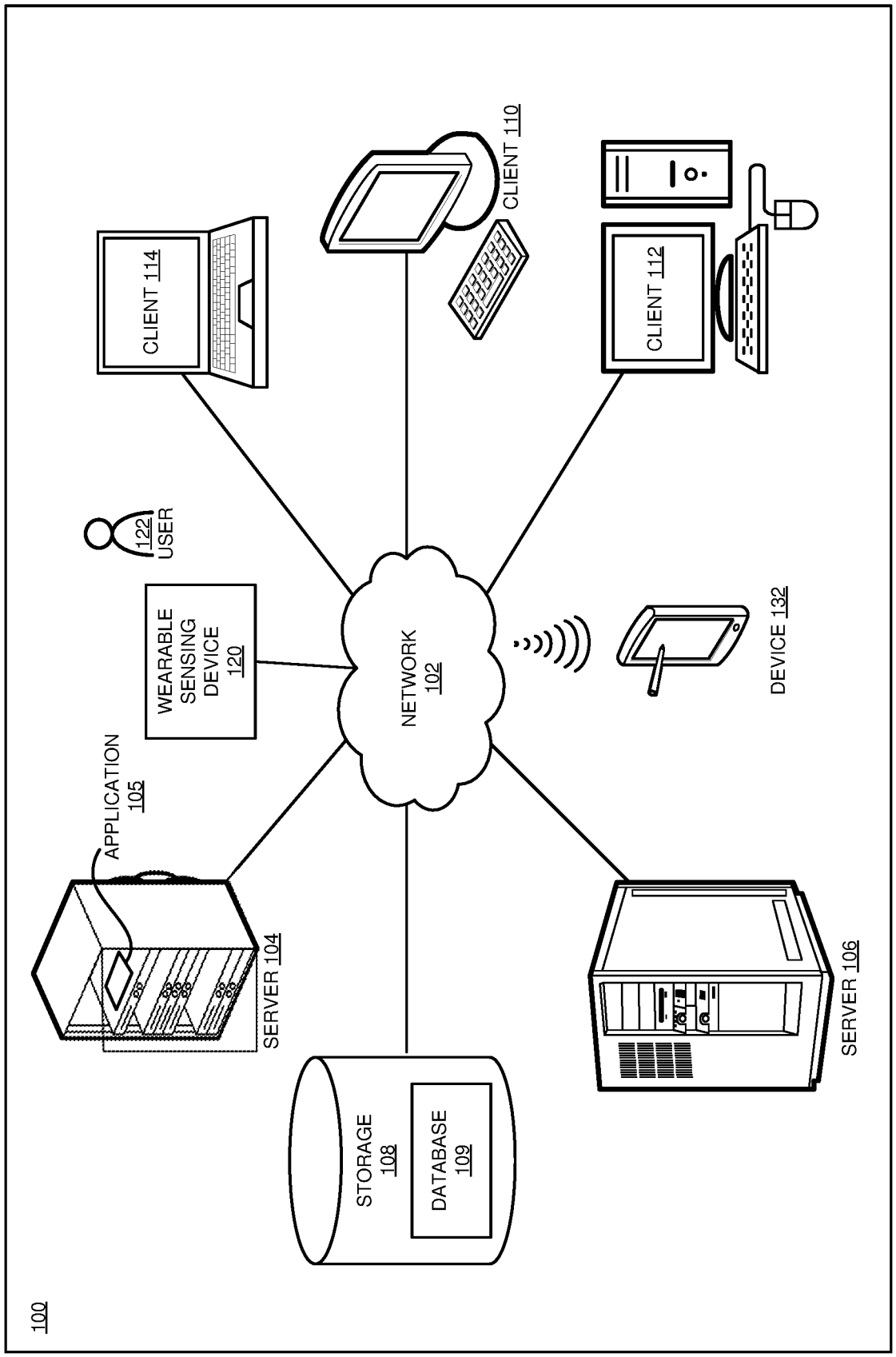
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to writing recognition.

An embodiment can be implemented as a software application. The application implementing an embodiment can be configured as a modification of an existing writing recognition system, as a separate application and/or device that operates in conjunction with a writing recognition system, a standalone application and wearable sensing device, or some combination thereof.

Various embodiments describe an apparatus, system, and method for writing and hand writing recognition without the need for a writing surface and writing tools. In one or more embodiments, a user performs gestures associated with writing using a body part, such as a finger, equipped with a wearable sensing device including or more pressure sensors attached to the body part. In particular embodiments, the pressure sensor, can be any sensor that can detect the changes in pressure of the finger or other body part in interaction with any surface, such as a piezo-resistive, strain-gauge sensor (SGS), piezo-electric sensor, capacitive sensor or LEDs/Photodetectors configured to reveal pressure changes on an external tissue based on color changes. In a particular example, the pressure sensor is deployed on a finger nail, and derives parameters of local pressure, shear, and torsion of the finger nail in interaction with any surface. In one or more embodiments, the pressure sensor may use measurements of one or more of pressure, tension, and compression of a body part to provide measurement data.

In an embodiment, a system includes a wearable sensing device having one or more pressure sensors configured to be disposed upon a body part, a medium, and a storage and processing unit. In one or more embodiments, the body part may be any body part that can be attached to the pressure sensor such as a fingernail of a hand. In one or more embodiments, the medium can be any medium for writing including, but not limited to, any surface (such as flat or non-flat surfaces) that induce changes in pressure of the pressure sensor, e.g. a 2-D surface such as a table or wall, when the body part is pressed again the surface. In particular embodiments, the medium can be also non-rigid surface such as cloth or even air in which movement of the body part in the air induces changes in pressure of the body part. The pressure sensor of the wearable sensing device may include any suitable technology for sensing pressure applied to a body part such as a piezo-resistive sensor or an optical sensor such as a camera. In some embodiments, the wearable sensing device may further include one or more additional sensors such as an accelerometer or a gyroscope.

In one or more embodiments, the wearable sensing device digitizes physical pressure measurements while a user makes gestures associated with handwriting and pre-processes the digitized pressure measurements to standardize the pressure measurements for further processing. In an embodiment, the pre-processed pressure measurements are sent to a storage and processing unit. In the embodiment, the storage and processing unit is configured to decode the pressure measurements associated with the gestures into a handwriting output and stores the results as further described herein.

One or more embodiments provide for a method and apparatus for writing using a pressure sensor and/or other sensors such as accelerometers or gyroscopes disposed upon a body part to provide for writing recognition of gestures indicative of writing. Particular embodiments provide for human to computer translation of letters and numbers. Other particular embodiments provide for a virtual keyboard for typing. Still other embodiments provide for using writing recognition to determine health and wellness trends of a user by quantitative trending and testing for the user after the system is trained or personalized to the user, and trending data over time under various use conditions.

One or more embodiments described herein may utilize writing recognition to diagnose medical conditions such as quantitative trending for medical conditions based on hand writing features and testing and quantitative trending for unified Huntington's disease rating scale (UHDRS) or a unified Parkinson's disease rating scale (UPDRS) evaluation.

In other embodiments, the principles described herein can be adapted to other uses beyond location sensing of a body part, such as a human fingernail or toenail, or other location sensing for a human machine interface to security, gaming, human health monitoring, testing, trending, and animal health monitoring applications.

Various embodiment described herein provide for a handwriting apparatus that does not need a pen, surface for handwriting, keyboard or touch screen. One or more embodiments provide for aggregation of kinematic features (e.g., extracted from acceleration measurements) and dynamic features (e.g., extracted from pressure measurements) to recognize handwriting.

The illustrative embodiments are described with respect to certain types of transmissions, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
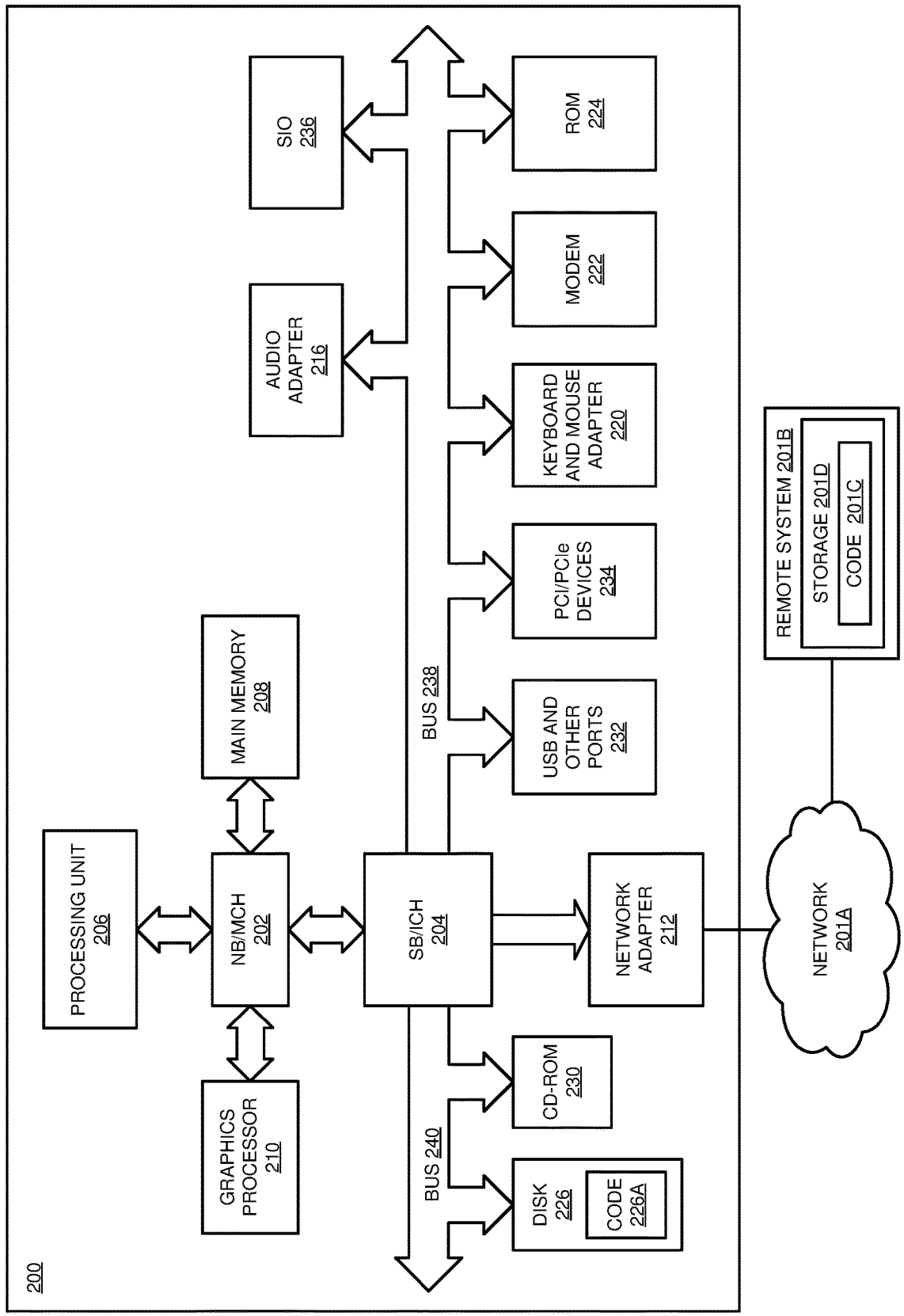
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

A wearable sensing device 120 includes one or more pressure sensors configured to be disposed upon one or more body parts of user 122 for detecting pressure changes within the body part. In one or more embodiments, the wearable sensing device 120 further includes one or more accelerometers for sensing motion of the body part.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a smart watch, a tablet computer, a laptop computer, client 110 in a stationary or a portable form, a wearable computing device, or any other suitable device. In a particular embodiment, wearable sensing device 102 and device 132 communicate directly with one another such as by peer-to-peer Bluetooth. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. A database 109 may be stored in storage 108 as shown or supplied by another source (not shown). Servers 104 and 106, storage unit 108, and clients 110, 112, and 114, and device 132 may couple to network 102 using wired connections, wireless communication protocols, or other suitable data connectivity. Clients 110, 112, and 114 may be, for example, a smart phone, personal computers a vehicle computer, or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, watch, vehicle computer or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
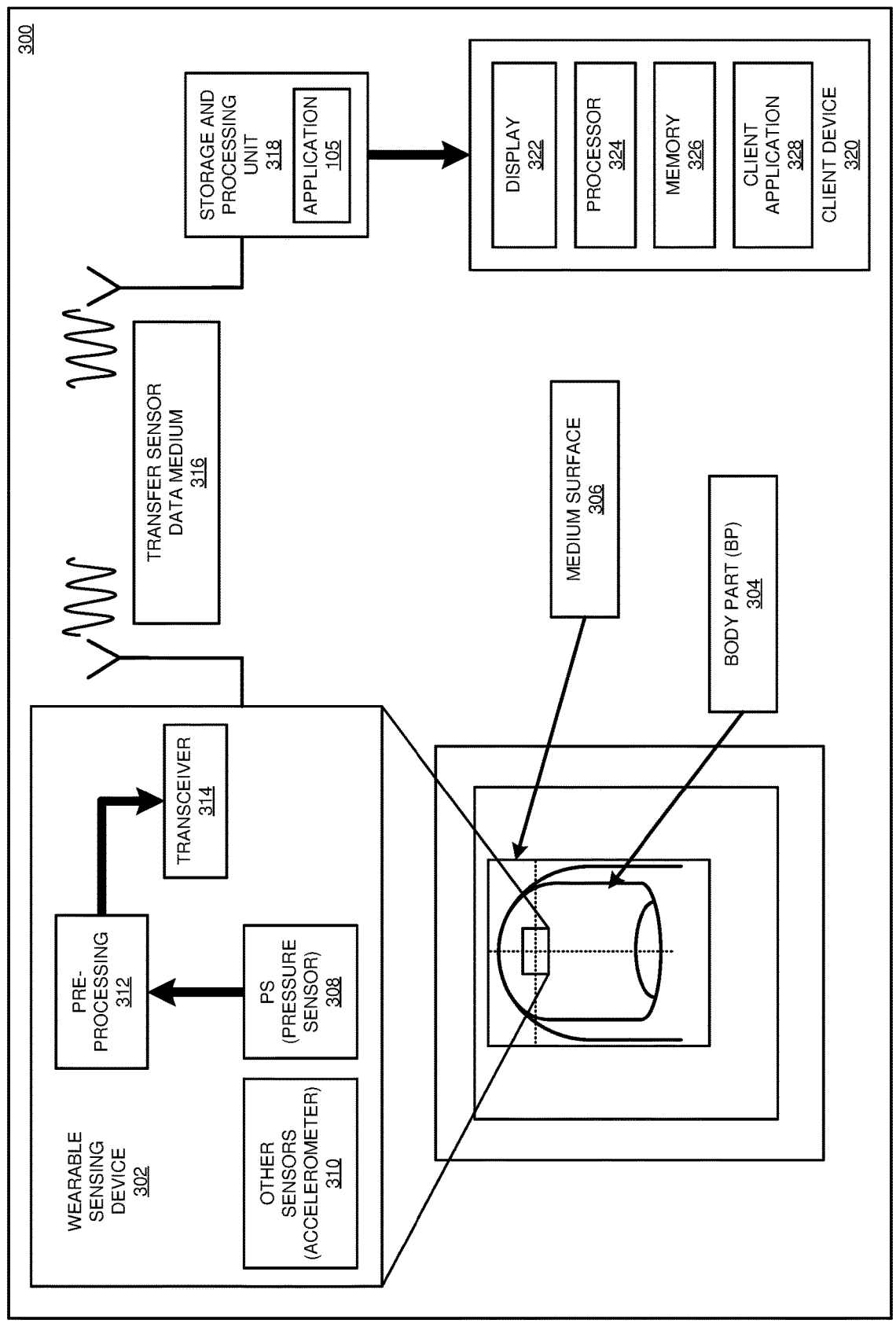
FIG. 3 depicts a block diagram of an example configuration for writing recognition using a wearable pressure sensing device in accordance with an illustrative embodiment.

With reference to FIG. 3, this figure depicts a block diagram of an example configuration 300 for writing recognition using a wearable pressure sensing device in accordance with an illustrative embodiment. Wearable sensing device 302 is an example of wearable sensing device 120 of FIG. 1. Storage and processing unit 318 is an example of client 114, device 132, server 104 of FIG. 1. Application 105 is an example of application 105 of FIG. 1 and may be included in one or more of clients 110, 112, 114, and device 132. Client device 320 is an example of client device 110 of FIG. 1. In the embodiment, wearable sensing device 302 is disposed upon a body part 304, such as a fingernail of a hand, a toenail of a user. In one or more embodiments, the user applies pressure to a medium surface 306, such as a writing surface or a tablet, with body part 304 using motions indicative of writing.

In the embodiment, wearable sensing device 302 includes one or more pressure sensors 308, other sensors including an accelerometer 310, a pre-processing component 312, and a transceiver 314. In one or more embodiments, one or more of wearable sensing device 302, storage and processing unit 318, and client device 320 may be integrated into a single device. In one or more embodiments, the other sensors may include one or more of an accelerometer, a gyroscope, a magnetometer, or a temperatures sensor. In a particular embodiment, wearable sensing device 302 may include a power supply, such as a battery, that may be charged by movement of a body part such as a hand.

In an embodiment, the user having wearable sensing device 302 disposed on body part 304 gestures upon a medium surface 306 using motions indicative of writing shapes such as symbols, letters, and/or commands upon medium surface 306. Pressure sensor 308 of wearable sensing device 302 receives pressure measurement signals from body part 304 as a result of the gestures and provides the pressure measurement signals to pre-processing component 312. In the embodiment, other sensors 310 obtain kinetic data, such as accelerometer data, of the movement of body part during the gestures and provides the kinetic data to pre-processing component 312. and input the pressure measurement signals to a pre-processing stage in the wearable sensing device.

In the embodiment, pre-processing component 312 of wearable sensing device 302 pre-processes the pressure measurement inputs and kinetic data inputs to standardize the sensor readings and compensate for changes between different repetitions and configurations. In an embodiment, pre-processing includes one or more of removal of biases, for example a direct current (DC) component from the pressure input data to compensate for variations of the output voltage of each sensor, excluding undesired frequencies content by filtering, such as by a Kalman filter, scaling the pressure measurement input data and removing temporal artifacts.

In the embodiment, pre-processing component 312 sends the pre-processed pressure and kinetic data to transceiver 314, and transceiver 314 transmits the pre-processed pressure and kinetic data to storage and processing unit 318 via a transfer sensor data medium 316. In particular embodiments, transfer sensor data medium 316 is a wireless transfer medium. In other particular embodiments, transfer sensor data medium 316 is a wired transfer medium.

In the embodiment, application 105 of storage and processing unit 318 reduces the dimensionality of the pressure measurement data and/or kinetic data. In one or more embodiments, application 105 reduces the pressure measurement data and/or kinetic data to a lower data rank, to make the data more representable, or to remove artifacts for the data. In one or more embodiments, application 105 reduces the dimensionality of the pressure measurement data and/or kinetic data by transferring the data to an independent component base. In particular embodiments, application 105 reduces the dimensionality of the pressure measurement data and/or kinetic data along the x and y axis using one or more dimensionality reduction algorithms such as principle component analysis (PCA) or independent component analysis (ICA), or feature selection algorithms.

In the embodiment, application 105 detects writing symbol start and end boundaries from the pressure measurement data and/or kinetic data. For writing recognition, precise detection of a start and end of a written symbol is needed. In an embodiment, the state at which body part 304 is in a steady state, not necessarily a state with minimal pressure change of pressure sensor 308, is considered as a reference state or an off state. Deviation from the off state is defined as an on state. In particular embodiments, deviation from the reference state is performed by edge detection algorithms, such as by thresholding the signal over the stead state level, or using machine learning tools, that provide the probabilities of start/and end based on the signal patterns with using trained data, and thus exclude the need of having thresholds. In particular embodiments in which multiple pressure sensors have deformation at the same time, an envelope composed of average sum of the pressure measurement signals may be used to detect deviation from the reference state.

In the embodiment, application 105 extracts features per gesture based upon the detected writing symbol start and end boundaries. In addition to using raw pressure measurement data and/or kinetic data, application 105 extracts spatial, temporal, and spectral features from the pressure measurement data and/or kinetic data. Spatial features are based on prior information regarding a location of pressure sensor 308. Temporal features can include the raw signal pattern in its boundaries of the pressure measurement data, and any statistical measures based on this raw data including statistical moments such as mean, standard deviation, signal peak amplitude, mean amplitude, and duration. Spectral features include information regarding the signal behavior in different frequencies such as peak and median frequencies. In particular embodiments, another set of temporal features, can be derived by a relationship between consecutive gestures. For example, application 105 may derive a delay between adjustment gestures by a start and an end of the gestures, or a correlation of the signal wave between consecutive gestures.

In the embodiment, application 105 includes a classifier component that uses a classification algorithm to recognize symbols indicated by the extracted features of the gestures. In an embodiment, the classification algorithm uses the extracted features to decode information in the two-dimensional symbols of the gestures including shapes, letters, punctuations, and commands such as backspace, space, etc. In a particular embodiment, the classifier component may use deep-learning based techniques for classification such as aa neural network.

In particular embodiments, the classification algorithm can be supervised based on the output of a training or a calibration process, unsupervised based on prior-knowledge related to the gesture, or a combination of supervised and unsupervised algorithm. In particular embodiments, the classification algorithm can include additional sensors receiving kinetic data such as accelerometers or gyroscopes.

In an embodiment, a trained symbol database is used to store patterns of different symbols that compose letters, punctuations, or commands. In particular embodiments, the database also stores the symbol features to be used by the classifier. In an embodiment, the application 105 classifies a symbol based upon prior-knowledge related to the gesture considering physiological movement constraints of body part 304 including typical values, maximal and minimal feature values. In the embodiment, the prior knowledge is translated to a function of the symbols. In an embodiment, application 105 aggregates kinetic data from other sensors 310 such as accelerometer and gyroscope data and provided to the classifier component in addition to the pressure sensor data to enable the classifier to more accurately detect symbol start and end, estimate finger location in the space, and thus provide more accurate writing recognition.

In the embodiment, application 105 uses a letter detection algorithm to determine one or more letters, punctuation, and commands from the symbols. In particular embodiments, the letter detection algorithm uses the extracted features including features between symbols such as delays between symbols, and other sensors data to estimate a letter/punctuation/command. In particular embodiments, the letter detection algorithm uses prior knowledge based on a training/calibration phase, or prior statistical knowledge regarding the symbols that compose the letters/punctuation/command. In particular embodiments, the writing indicated by the gestures can simulate keyboard letters/punctuation. In a particular embodiment, depending on visual feedback, commands can be given, for instance, to repeat a word, to delete a word, etc. In particular embodiments, the letter detection algorithm is based on machine learning algorithms such as a Hidden Markov Model (HMM) or a neural network, that can embed shapes to letters.

In the embodiment, application 105 uses a word detection algorithm to detect words based upon the detected letters, detected punctuation and their respective features. For example, a start and an end of new words can be identified by exploiting temporal latencies between letters, or by regular or dedicated punctuation signs. In particular embodiments, application 105 applies an auto-correction mechanism based on statistical prior word knowledge to detect words such as using auto-spelling and sentence context. In another particular embodiment, for each word, alternative, similar spelling considerations, and statistical confidence of a letter can be presented to the user in a graphical user interface having a dedicated symbol for choosing the right word. In another particular embodiment, a graphical user interface is presented providing control commands of the system, such as deleting words, re-typing words, or choosing from multiple word choices. In particular embodiments, the word prior knowledge can include a complete word full dictionary, a-prior statistical probability regarding the probability of letters in a word, condition probability of letters based on previous letters, sentence context, visual or auditory cues, and/or a relationship between different words. In particular embodiments, the word/sentence detection algorithm is based on machine learning algorithms such as a Hidden Markov Model (HMM) or a neural network, that can embed letters to words, and sentences.

In the embodiment, after recognizing the words, storage and processing unit 318 sends the recognized words to client device 320. In the particular embodiment of FIG. 3, client device 320 includes a display 322, a processor 324, a memory 326, and a client application 328. Processor 324 is configured to execute software instructions stored in memory 326 to perform one or more operations of client device 320 described herein. In the embodiment, client application 328 is configured to receive the recognized words and display the recognized words within a graphical user interface of display 322.

Figure 4A:
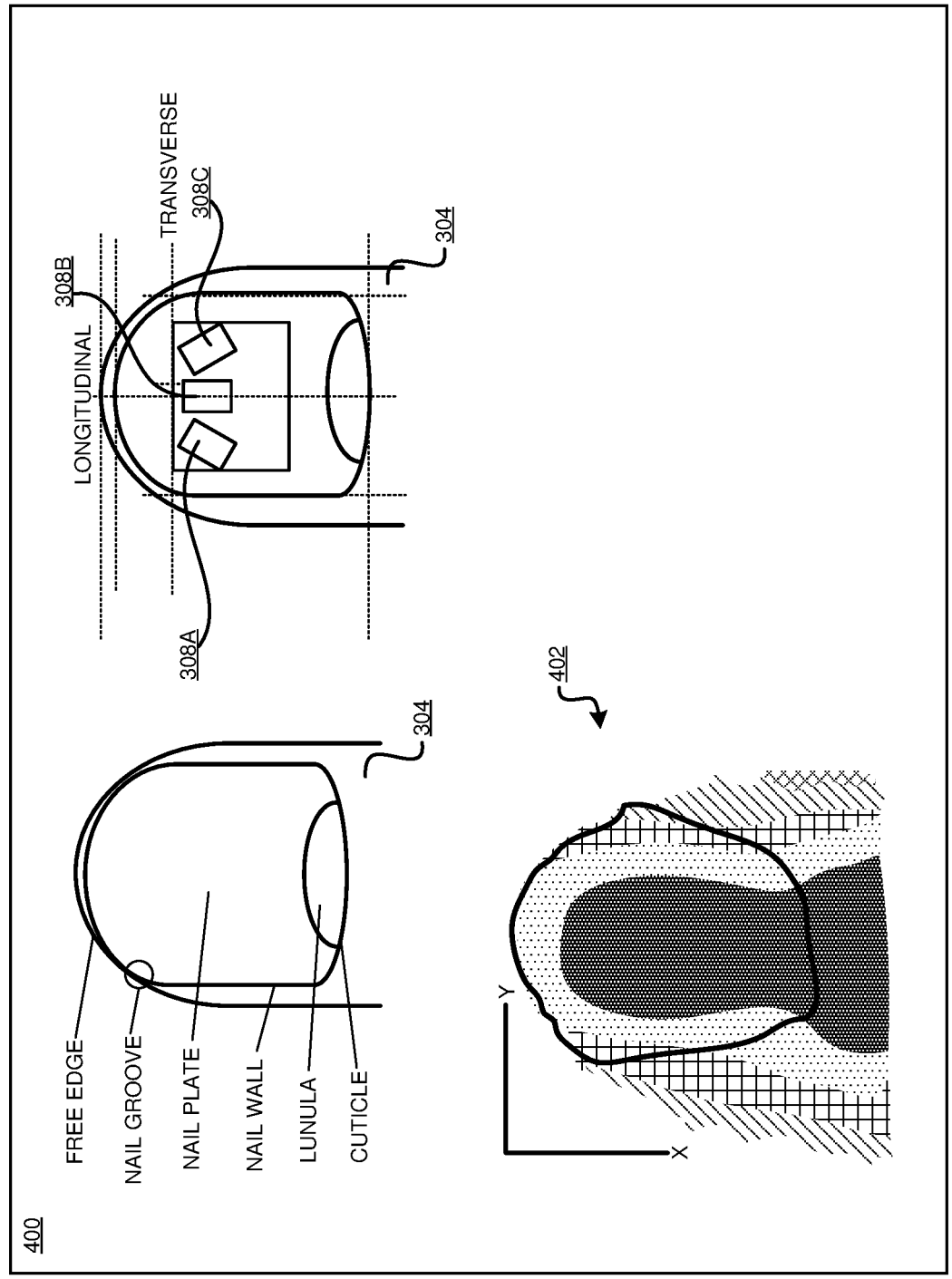
FIG. 4A depicts an example pressure sensor configuration for the wearable sensing device in accordance with an illustrative embodiment.

With reference to FIG. 4A, this figure depicts an example pressure sensor configuration 400 for wearable sensing device 302 in accordance with an illustrative embodiment. In the embodiment of FIG. 4, wearable sensing device 302 includes a first (left) pressure sensor 308A, a second (middle) pressure sensor 308B, and a third (right) pressure sensor 308C disposed upon body part 304. In the particular embodiment of FIG. 4A, first pressure sensor 308A, second pressure sensor 308B, and third pressure sensor 308C are disposed upon a nail plate of a finger. In a particular embodiment, first pressure sensor 308A, second pressure sensor 308B, and third pressure sensor 308C are each strain-gauge sensors. Pressure measurement output 402 is shown as a representation of the combined pressure measurements of each of first pressure sensor 308A, second pressure sensor 308B, and third pressure sensor 308C while body part 304 is pressed against a surface. In the embodiment, darker areas of pressure measurement output are representative of greater pressure exerted on the surface.

Figure 4B:
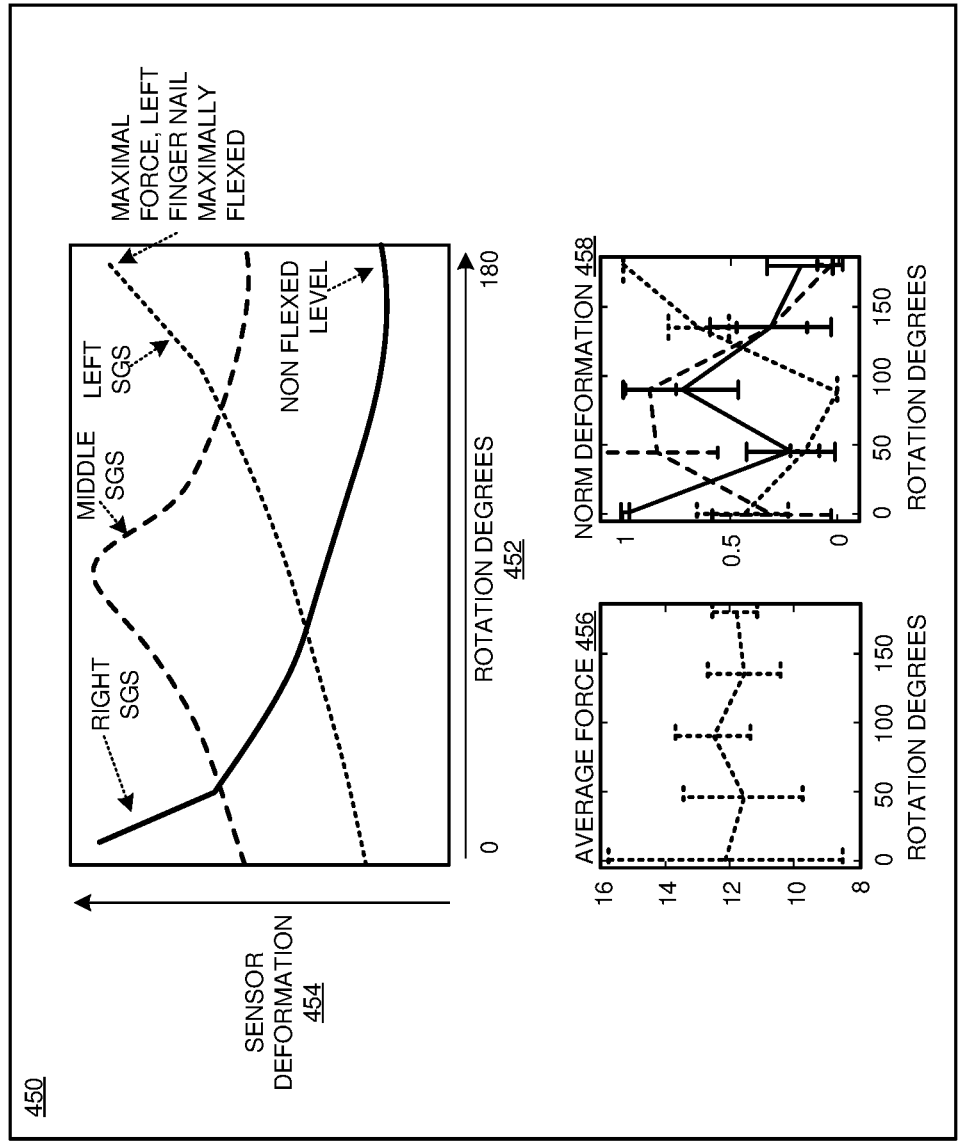
FIG. 4B depicts an example of pressure sensor measurements of the pressure sensor configuration of FIG. 4A in accordance with an illustrative embodiment.

With reference to FIG. 4B, this figure depicts an example of pressure sensor measurements 450 of the pressure sensor configuration 400 of FIG. 4A in accordance with an illustrative embodiment. In the embodiment, a rotational degrees 452 axis is plotted against a sensor deformation axis 454 for each of first pressure sensor (left SGS) 308A, second pressure sensor (middle SGS) 308B, and third pressure sensor (right SGS) 308C illustrating a non-flexed condition of third pressure sensor (right SGS) 308C and a maximally flexed condition of first pressure sensor (left SGS) 308A in which maximal force is applied. FIG. 4B further includes an average force plot 456 and a normal deformation plot 458 for each of first pressure sensor (left SGS) 308A, second pressure sensor (middle SGS) 308B, and third pressure sensor (right SGS) 308C.

Figure 5:
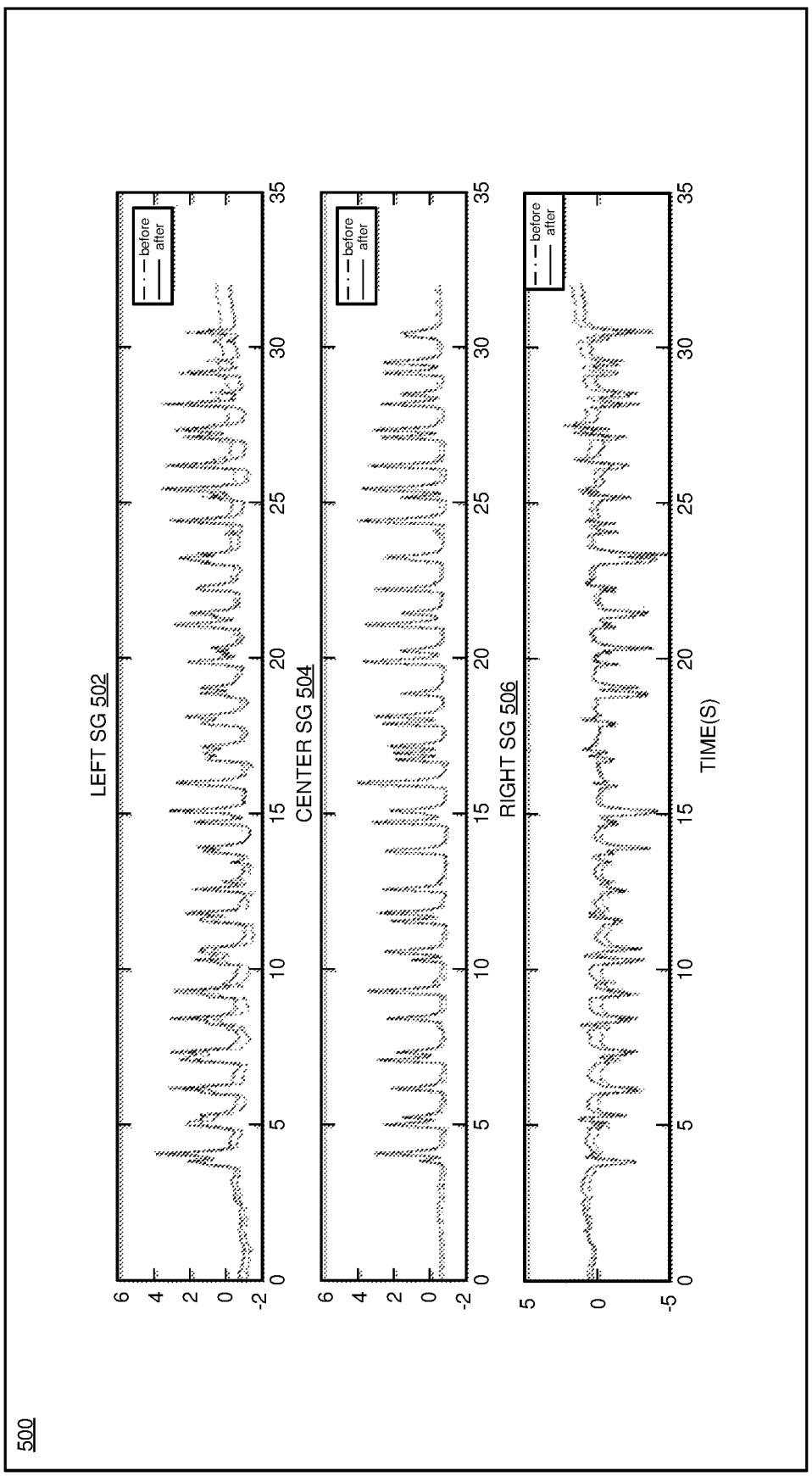
FIG. 5 depicts an example preprocessing operation of the wearable sensing device in accordance with an illustrative embodiment.

With reference to FIG. 5, this figure depicts an example preprocessing operation 500 of wearable sensing device 302 in accordance with an illustrative embodiment. In the embodiment of FIG. 5, a first pressure sensor measurement plot 502 for first pressure sensor (left SGS) 308A, a second pressure sensor measurement plot 504 for second pressure sensor (middle SGS) 308B, and a third pressure sensor measurement plot 506 for third pressure sensor (right SGS) 308C is shown including before and after pre-processing plots of the measurement values for each of the respective pressure sensors. In the embodiment of FIG. 5, the pre-processing includes filtering, reducing bias, reducing unexpected frequency content, and reducing noise in the pressure measurement signals for each of first pressure sensor (left SGS) 308A, second pressure sensor (middle SGS) 308B, and third pressure sensor (right SGS) 308C. In the particular embodiment of FIG. 5, a Kalman filter is applied to exclude bias.

Figure 6A:
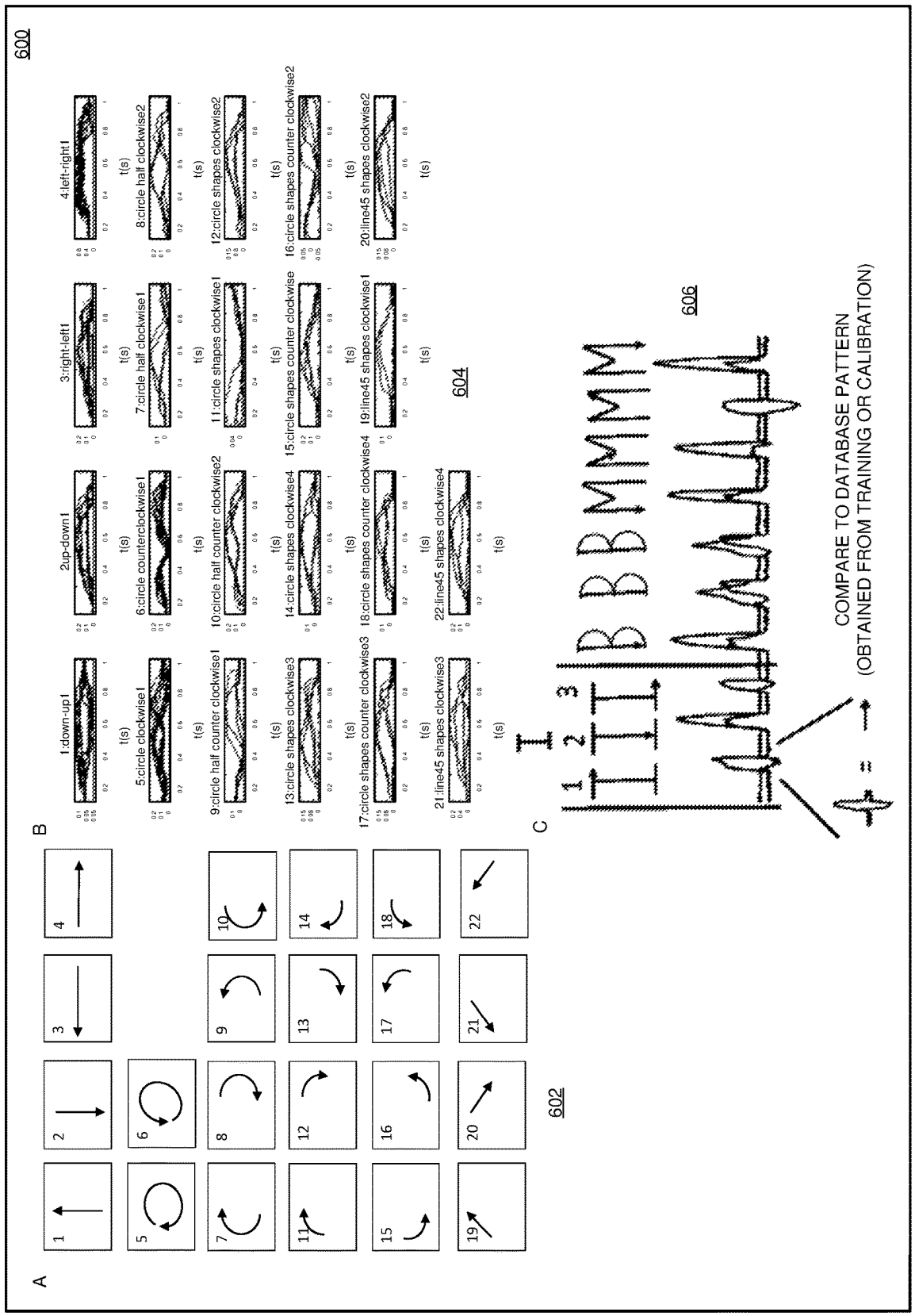
FIG. 6A depicts an example of writing recognition by aggregation of basic shapes in accordance with an illustrative embodiment.

With reference to FIG. 6A, this figure depicts an example 600 of writing recognition by aggregation of basic shapes in accordance with an illustrative embodiment. In the embodiment of FIG. 6A, writing symbol shapes 602 are shown with associated pressure sensor signal values 604. In the embodiment of FIG. 6A, recognition of capital letter handwriting by aggregation of basic symbol shapes is shown in which each capital letter is recognized by detection of symbols that are aggregated to form letters. In the embodiment of FIG. 6A, an example 606 of handwriting of the capital letters forming "IBM" by basic symbol gestures is shown along with corresponding x and y pressure sensor values. The pressure sensor values are compared to a database/dictionary of patterns obtained from training or calibration to decode the particular letters "IBM". By using the dictionary and a pattern matching algorithm, application 105 decodes the symbols (shapes) 1,2,3, and then combines them by using temporal features and statistical knowledge to letters in which symbols 1,2,3 compose the capital letter I in this example.

Figure 6B:
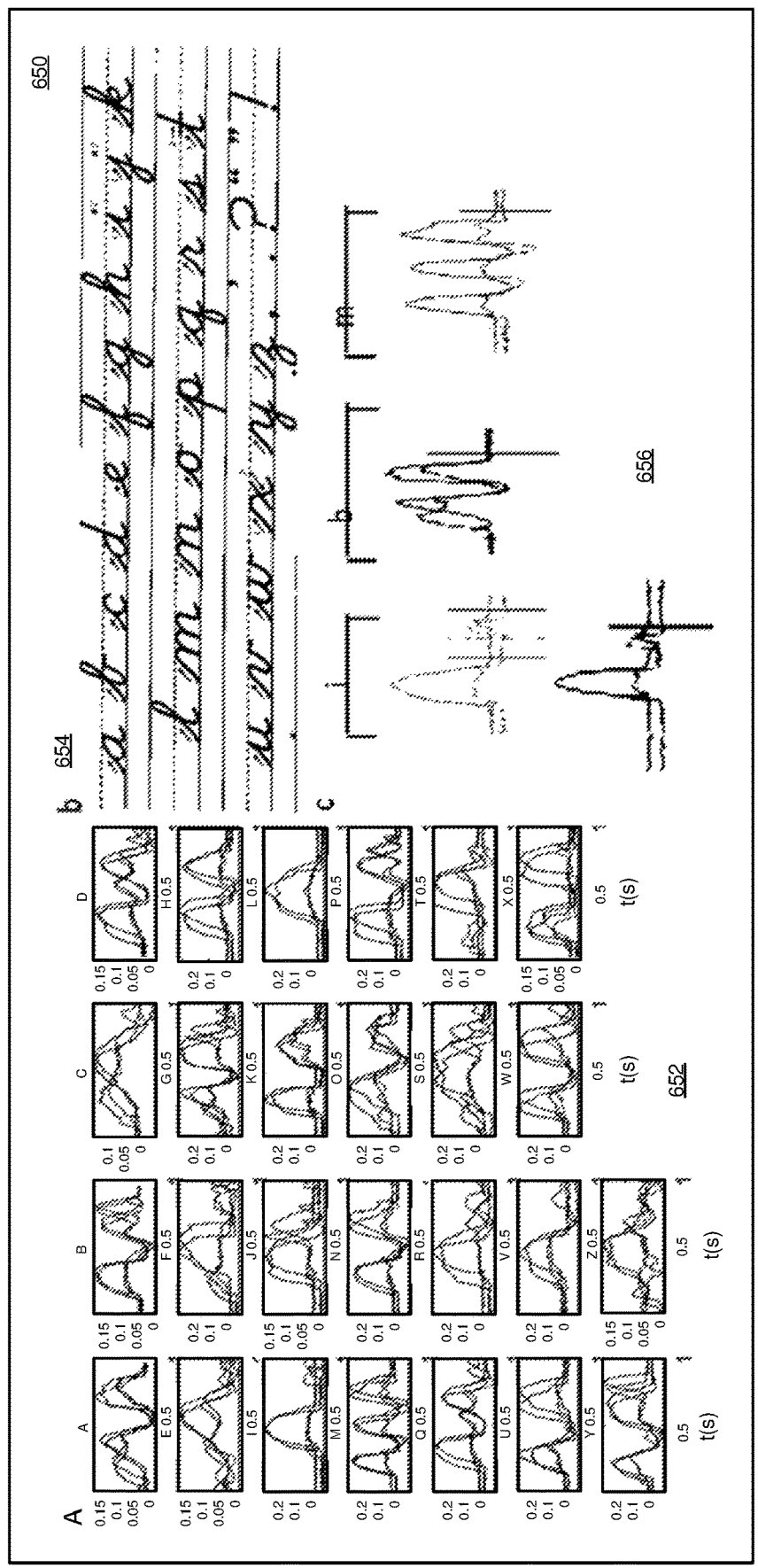
FIG. 6B depicts another example of writing recognition by aggregation of basic shapes in accordance with an illustrative embodiment.

With reference to FIG. 6B, this figure depicts another example 650 of writing recognition by aggregation of basic shapes in accordance with an illustrative embodiment. In the embodiment of FIG. 6B, recognition of cursive letter handwriting by aggregation of basic symbol shapes is shown in which each cursive letter is recognized by detection of each letter pattern and the start and end of each letter. In the embodiment of FIG. 6B, cursive letter shapes 654 are shown with associated pressure sensor signal values 652. In the embodiment of FIG. 6B, an example 656 of handwriting of the cursive letters forming "ibm" by basic symbol gestures is shown along with corresponding x and y pressure sensor values. The pressure sensor values are compared to a database of letter patterns obtained from training or calibration to decode the particular letters "ibm".

Figure 7:
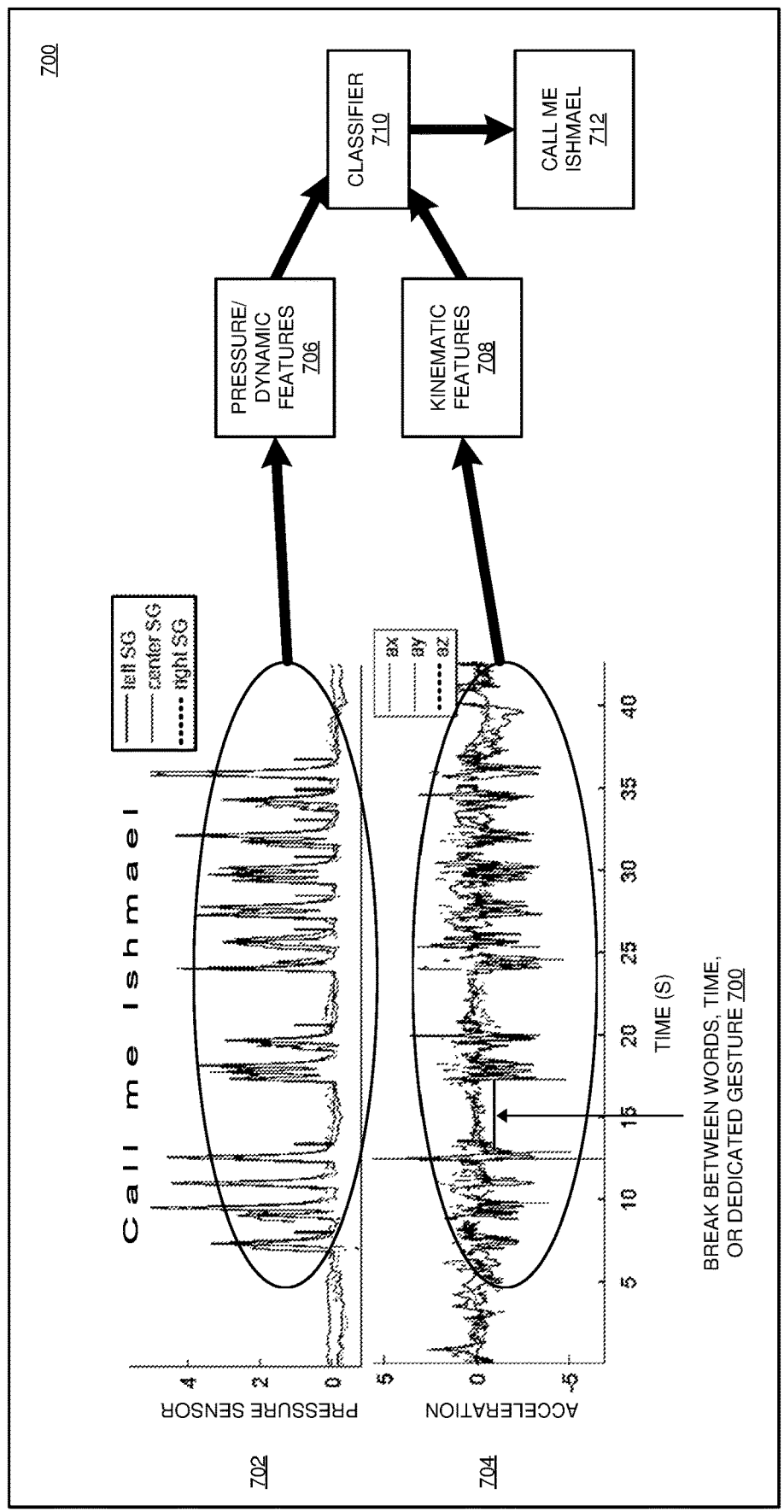
FIG. 7 depicts an example of writing recognition using a wearable pressure sensing device in accordance with an illustrative embodiment.

With reference to FIG. 7, this figure depicts an example of writing recognition using a wearable pressure sensing device in accordance with an illustrative embodiment. In example 700, pressure sensor measurements 702 from wearable sensing device 302 are shown for each of first pressure sensor (left SGS) 308A, second pressure sensor (middle SGS) 308B, and third pressure sensor (right SGS) 308C during writing of the phrase "Call me Ishmael" by gestures of a user having wearable sensing device 302 disposed upon body part 304. Example 700 further shows and acceleration measurements 704 from an accelerometer of wearable sensing device 302 during writing of the phrase. In the embodiment, pressure sensor measurements 704 are provided to a pressure/dynamic features extraction component 706 of application 105 configured to extract one or more pressure/dynamic features from pressure sensor measurements 704. Acceleration measurements 704 are provided to a kinetic features extraction component 708 configured to extract one or more kinetic features, such as a break between words, a time, or dedicated gesture, from acceleration measurements 704. In the embodiment, the extracted pressure/dynamic features and extracted kinetic features are provided to a classifier component 710 of application 105. Classifier component 710 is configured to classify the pressure measurements 702 and acceleration measurements 704 using the extracted pressure/dynamic features and extracted kinetic features to produce an output 712 of "Call me Ishmael"

Figure 8:
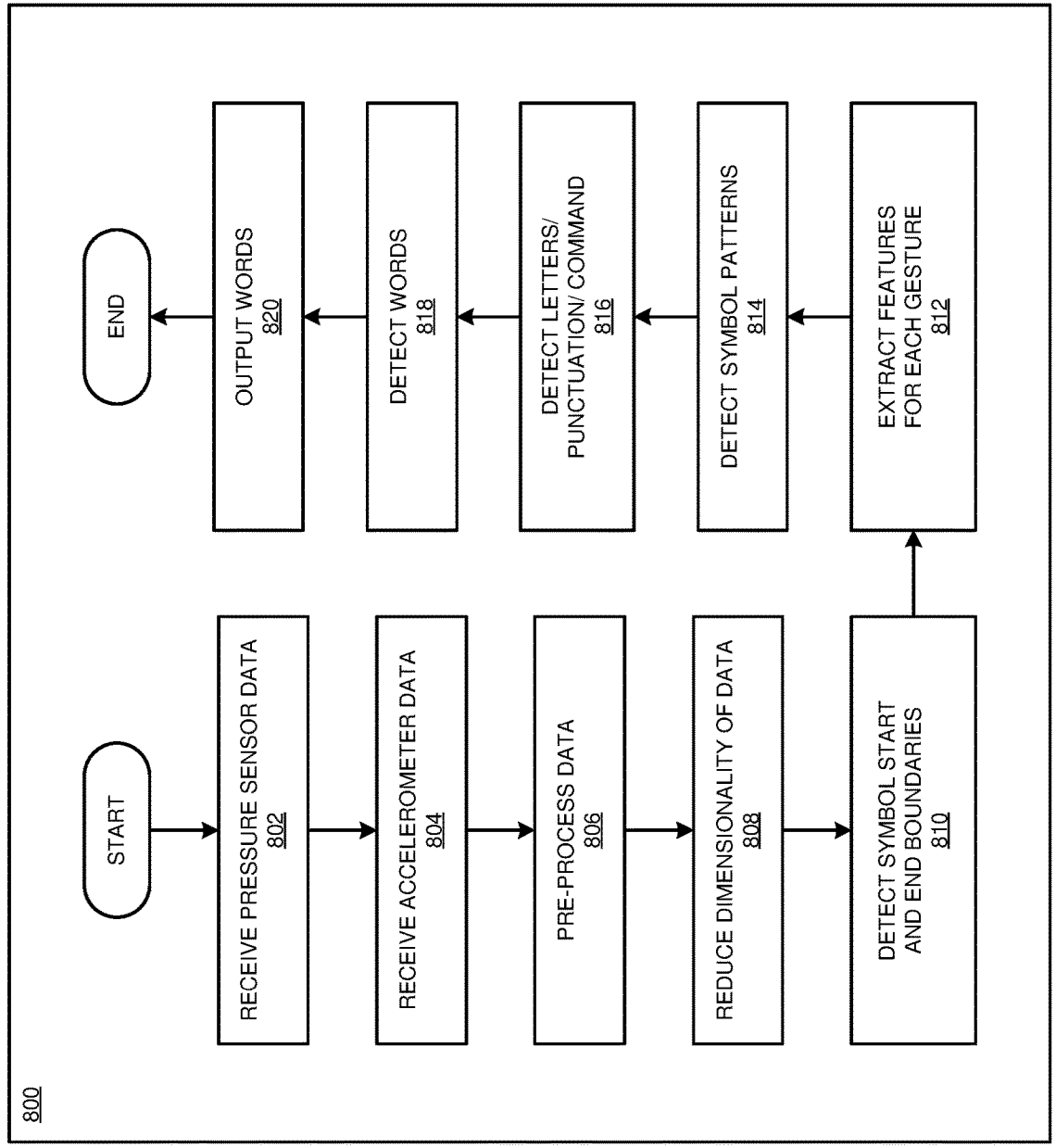
FIG. 8 depicts a flowchart of an example process for writing recognition using a wearable pressure sensing device in accordance with an illustrative embodiment.

With reference to FIG. 8, this figure depicts a flowchart of an example process for writing recognition using a wearable pressure sensing device in accordance with an illustrative embodiment. Process 800 can be implemented in application 105 of FIG. 1 or FIG. 3. In block 802, wearable sensing device 302 receives pressure sensor data from one or more pressure sensors disposed upon body part 304. In block 804, wearable sensing device 302 receives accelerometer data from one or more accelerometers of wearable sensing device 302.

In block 806, wearable sensing device 302 pre-processes the pressure sensor data and accelerometer data to standardize the sensor readings and/or compensate for changes between different repetitions and configurations. In an embodiment, pre-processing includes one or more of removal of a DC component from the pressure input data to compensate for variations of the output voltage of each sensor, scaling the pressure measurement input data and removing temporal artifacts.

In block 808, application 105 reduces a dimensionality of the pre-processed pressure sensor data and/or accelerometer data. In one or more embodiments, application 105 reduces the pressure measurement data and/or kinetic data to a lower data rank, to make the data more representable, or to remove artifacts for the data. In particular embodiments, application 105 reduces the dimensionality of the pressure measurement data and/or kinetic data using one or more dimensionality reduction algorithms such as PCA or ICA.

In block 810, application 105 detects writing symbol start and end boundaries from the pressure sensor data and/or accelerometer data. In block 812, application 105 extracts features for each gesture based upon the detected symbol start and end boundaries. In one or more embodiments, the features include spatial, temporal, and spectral features of the pressure measurement data and/or kinetic data. Spatial features are based on prior information regarding a location of pressure sensor 308. Temporal features include the raw signal pattern in its boundaries of the pressure measurement data, and any statistical measures based on this raw data including statistical moments such as mean, standard deviation, signal peak amplitude, mean amplitude, and duration. Spectral features include information regarding the signal behavior in different frequencies such as peak and median frequencies. In particular embodiments, another set of temporal features, can be derived by a relationship between consecutive gestures. For example, application 105 may derive a delay between adjustment gestures by a start and an end of the gestures, or a correlation of the signal wave between consecutive gestures.

In block 814, application 105 detects symbol patterns from the extracted features of the gestures. In block 816, application 105 uses the detected symbols to detect letters, punctuation, and or commands based upon aggregation of the detected symbols. In particular embodiments, application 105 uses prior knowledge based on a training/calibration phase, or prior statistical knowledge regarding the symbols that compose the letters/punctuation/command. In particular embodiments, the letter detection is based on machine learning algorithms such as a HMM or a neural network.

In 818, application 105 uses a word detection algorithm to detect words based upon the detected letters, detected punctuation and their respective features. In particular embodiments, application 105 detects the words based on statistical prior word knowledge. In block 820, application 105 outputs the detected words. Process 800 ends thereafter.

Figure 9:
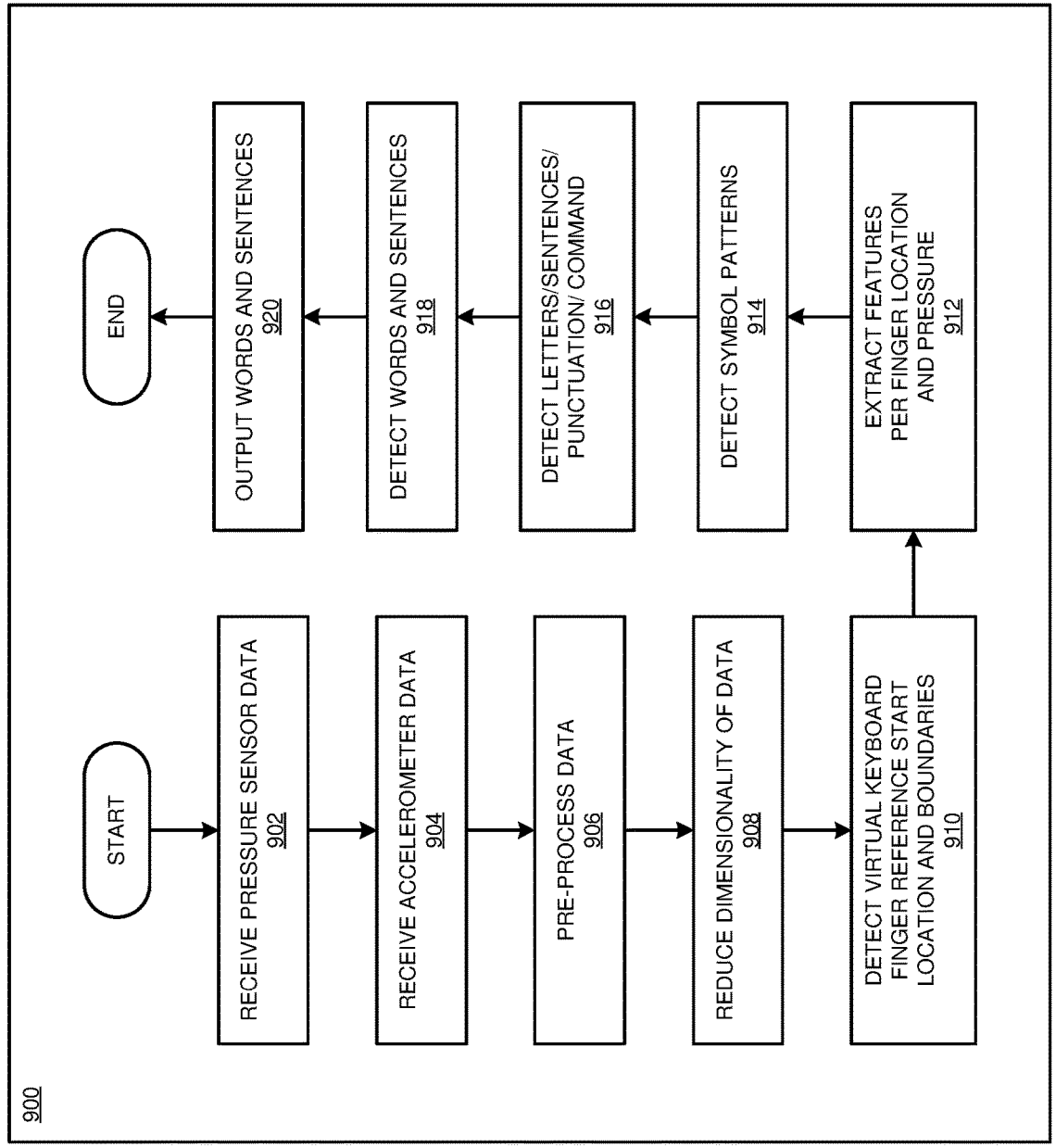
FIG. 9 depicts a flowchart of an example process for writing recognition using a wearable pressure sensing device to implement a virtual keyboard in accordance with an illustrative embodiment.

With reference to FIG. 9, this figure depicts a flowchart of an example process for writing recognition using a wearable pressure sensing device to implement a virtual keyboard in accordance with an illustrative embodiment. Process 900 can be implemented in application 105 of FIG. 1 or FIG. 3. In the embodiment of FIG. 9, a virtual keyboard is implemented in which gestures of a user are interpreted as typing on a virtual keyboard. In block 902, wearable sensing device 302 receives pressure sensor data from one or more pressure sensors disposed upon body part 304. In block 904, wearable sensing device 302 receives accelerometer data from one or more accelerometers of wearable sensing device 302.

In block 906, wearable sensing device 302 pre-processes the pressure sensor data and accelerometer data to standardize the sensor readings and/or compensate for changes between different repetitions and configurations. In an embodiment, pre-processing includes one or more of removal of a DC component from the pressure input data to compensate for variations of the output voltage of each sensor, scaling the pressure measurement input data and removing temporal artifacts.

In block 908, application 105 reduces the dimensionality of the pre-processed pressure sensor data and/or accelerometer data. In one or more embodiments, application 105 reduces the pressure measurement data and/or kinetic data to a lower data rank, to make the data more representable, or to remove artifacts for the data. In particular embodiments, application 105 reduces the dimensionality of the pressure measurement data and/or kinetic data using one or more dimensionality reduction algorithms such as PCA or ICA.

In block 910, application 105 detects a virtual keyboard finger reference start location and start and end boundaries of symbols from the pressure sensor data and/or accelerometer data. In block 912, application 105 extracts features for each finger location and pressure measurement data associated with a gesture. In one or more embodiments, the features include spatial, temporal, and spectral features of the pressure measurement data and/or kinetic data.

In block 914, application 105 detects symbol patterns from the extracted features of the gestures. In block 916, application 105 uses the detected symbols to detect letters, sentences, punctuation, and/or commands based upon aggregation of the detected symbols. In particular embodiments, application 105 uses one or more of a trained keyboard/letter dictionary having prior knowledge of letters, words, sentences, punctuation and commands, prior knowledge regarding keyboard configuration, and accelerometer data to detect the letters, sentences, punctuation, and or commands.

In 918, application 105 detects words and sentences based upon the detected letters, detected letters, sentences, and punctuation. In particular embodiments, application 105 detects the words based on statistical prior word knowledge. In block 920, application 105 outputs the detected words and sentences. Process 900 ends thereafter.

Figure 10:
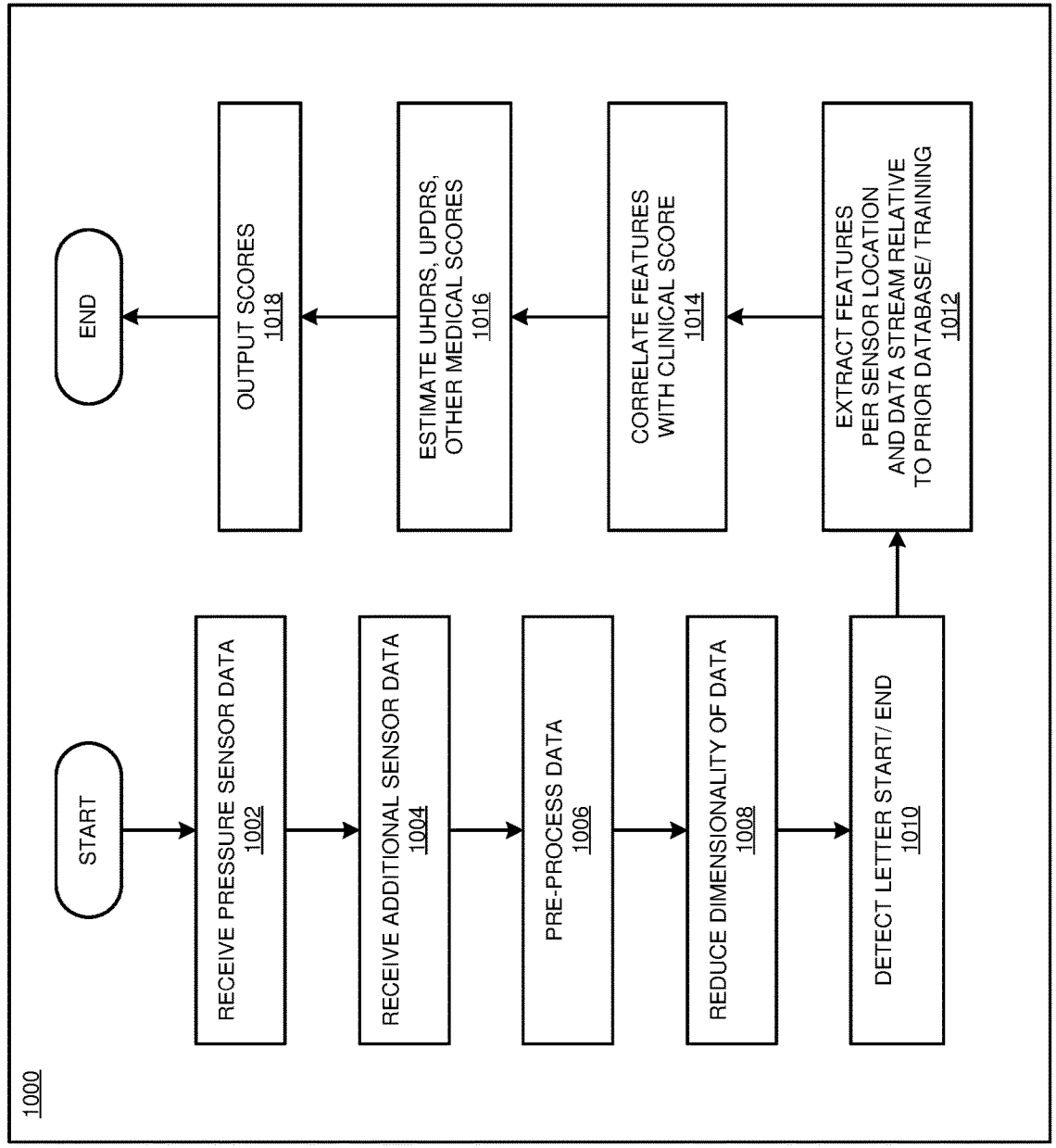
FIG. 10 depicts a flowchart of an example process for writing recognition using a wearable pressure sensing device to be used for detecting medical conditions.

With reference to FIG. 10 this figure depicts a flowchart of an example process for writing recognition using a wearable pressure sensing device to implement a degenerative medical condition diagnostic in accordance with an illustrative embodiment. In particular embodiments, the degenerative medical condition is measured by a unified Huntington's disease rating scale (UHDRS) score or a unified Parkinson's disease rating scale (UPDRS) score. In other embodiments, the degenerative medical condition may use any other suitable medical score indicative of the degenerative medical condition. Process 1000 can be implemented in application 105 of FIG. 1 or FIG. 3. In the embodiment of FIG. 11, UHDRS, UPDRS or other medical condition testing is implemented in which gestures of a user are interpreted as a measure of UHDRS, UPDRS, or other medical score rating of a person. In block 1002, wearable sensing device 302 receives pressure sensor data from one or more pressure sensors disposed upon body part 304. In block 1004, wearable sensing device 302 receives additional sensor data such as accelerometer data from one or more additional sensors of wearable sensing device 302.

In block 1106, wearable sensing device 302 pre-processes the pressure sensor data and additional sensor data to standardize the sensor readings and/or compensate for changes between different repetitions and configurations. In an embodiment, pre-processing includes one or more of removal of a bias, such as a DC component bias, from the pressure input data to compensate for variations of the output voltage of each sensor, scaling the pressure measurement input data and removing temporal artifacts.

In block 1008, application 105 reduces the dimensionality of the pre-processed pressure sensor data and/or additional sensor data. In one or more embodiments, application 105 reduces the pressure measurement data and/or kinetic data to a lower data rank, to make the data more representable, or to remove artifacts for the data. In particular embodiments, application 105 reduces the dimensionality of the pressure measurement data and/or kinetic data using one or more dimensionality reduction algorithms such as PCA or ICA.

In block 1010, application 105 detects letter or other symbol start and end boundaries from the pressure sensor data and/or accelerometer data. In block 1012, application 105 extracts features for each sensor location and pressure measurement data associated with a gesture relative to prior knowledge database/training. In one or more embodiments, the features include spatial, temporal, and spectral features of the pressure measurement data and/or kinetic data.

In block 1014, application 105 correlates the extracted features with a clinical score. In a particular embodiment, application 105 correlates the extracted feature with a clinical score based upon one or more of a trained system from a system trained from UHDRS, UPDRS, or other medical tests, prior knowledge from a personalized UHDRS, UPDRS, or other medical score database, and or strain gauge and accelerometer data from a calibration reference. In block 1016, application 105 estimates, a UHDRS score, a UPDRS score, or other medical score that may be correlated to writing features. In block 1018, application 105 outputs the UHDRS, UPDRS, or other medical diagnostic score. Process 1000 ends thereafter.

Thus, a computer implemented method, system or apparatus, and computer program product are provided in the illustrative embodiments for writing recognition using a wearable pressure sensing device and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration self contained or used in part with other data, sensors, computer systems, algorithms, trending or machine learning/artificial intelligence. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of writing recognition using a wearable pressure sensing device comprising:
receiving pressure measurement data from a pressure sensor disposed upon a body part of a user, the pressure measurement data indicative of a change in pressure of the body part due to an interaction of the body part with a medium indicative of a writing gesture by the user;
detecting a start boundary and end boundary for each of a plurality of writing symbols based upon the pressure measurement data, by detecting, as an off state, a reference state wherein the body part is in a steady state, and detecting an on state based on a deviation from the off state, wherein detection of the deviation from the off state is performed with edge detection techniques, extracting at least one feature of the pressure measurement data associated with the plurality of writing symbols;
detecting a symbol pattern based upon the extracted features;
detecting at least one letter based upon the symbol pattern; and
detecting a word based upon the detected at least one letter.

2. The method of claim 1, further comprising:
receiving kinetic data from a kinetic sensor disposed upon the body part of a user, wherein the detecting of the symbol pattern is further based upon the kinetic data.

3. The method of claim 1, further comprising:
reducing a dimensionality of the pressure measurement data prior to the detecting of the start boundary and end boundary.

4. The method of claim 3, further comprising:
pre-processing the pressure measurement data prior to the reducing of the dimensionality of the pressure measurement data.

5. The method of claim 4, wherein pre-processing of the pressure measurement data includes one or more of filtering out a bias and undesired frequencies content from the pressure measurement data, scaling the pressure measurement data and removing temporal artifacts from the pressure measurement data.

6. The method of claim 1, further comprising:
detecting a command based upon the extracted features.

7. The method of claim 1, further comprising:
detecting a symbol of a virtual keyboard based upon the extracted features.

8. The method of claim 1, further comprising:
detecting a medical condition of the user based upon the extracted features.

9. The method of claim 1, wherein the at least one feature includes one or more of a spatial feature, a temporal feature, and a spectral feature of the pressure measurement data.

10. The method of claim 1, wherein detecting of the symbol pattern is based upon prior statistical knowledge.

11. The method of claim 1, wherein the detecting of the at least one letter is performed using at least one of machine learning on the extracted features or on raw data of the pressure sensor with additional sensor data.

12. A computer usable program product comprising one or more computer-readable storage devices, and program instructions stored on at least one of the one or more storage devices, the stored program instructions comprising:
program instructions to receive pressure measurement data from a pressure sensor disposed upon a body part of a user, the pressure measurement data indicative of a change in pressure of the body part due to an interaction of the body part with a medium indicative of a writing gesture by the user;
program instructions to detect a start boundary and end boundary for each of a plurality of writing symbols based upon the pressure measurement data, by detecting, as an off state, a reference state wherein the body part is in a steady state, and detecting an on state based on a deviation from the off state, wherein detection of the deviation from the off state is performed with edge detection techniques,
program instructions to extract at least one feature of the pressure measurement data associated with the plurality of writing symbols;
program instructions to detect a symbol pattern based upon the extracted features;
program instructions to detect at least one letter based upon the symbol pattern; and
program instructions to detect a word based upon the detected at least one letter.

13. The computer usable program product of claim 12, further comprising:
program instructions to receive kinetic data from a kinetic sensor disposed upon the body part of a user, wherein the detecting of the symbol pattern is further based upon the kinetic data.

14. The computer usable program product of claim 12, further comprising:
program instructions to reduce a dimensionality of the pressure measurement data prior to the detecting of the start boundary and end boundary.

15. The computer usable program product of claim 14, further comprising:
program instructions to pre-process the pressure measurement data prior to the reducing of the dimensionality of the pressure measurement data.

16. The computer usable program product of claim 15, wherein pre-processing of the pressure measurement data includes one or more of filtering out a bias and undesired frequencies content from the pressure measurement data, scaling the pressure measurement data and removing temporal artifacts from the pressure measurement data.

17. The computer usable program product of claim 12, further comprising: further comprising:
program instructions to detect a command based upon the extracted features.

18. The computer usable program product of claim 12, wherein the computer usable code is stored in a computer readable storage device in a data processing system, and wherein the computer usable code is transferred over a network from a data processing system.

19. The computer usable program product of claim 12, wherein the computer usable code is stored in a computer readable storage device in a server data processing system, and wherein the computer usable code is downloaded over a network to a data processing system for use in a computer readable storage device associated with the data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive pressure measurement data from a pressure sensor disposed upon a body part of a user, the pressure measurement data indicative of a change in pressure of the body part due to an interaction of the body part with a medium indicative of a writing gesture by the user, by detecting, as an off state, a reference state wherein the body part is in a steady state, and detecting an on state based on a deviation from the off state, wherein detection of the deviation from the off state is performed with edge detection techniques,
program instructions to detect a start boundary and end boundary for each of a plurality of writing symbols based upon the pressure measurement data;
program instructions to extract at least one feature of the pressure measurement data associated with the plurality of writing symbols;

program instructions to detect a symbol pattern based upon the extracted features;
program instructions to detect at least one letter based upon the symbol pattern; and
program instructions to detect a word based upon the detected at least one letter.

* * * * *